(12) United States Patent
Lindqvist

(10) Patent No.: US 9,398,435 B2
(45) Date of Patent: Jul. 19, 2016

(54) INDICATING PHYSICAL CHANGE IN RELATION TO AN EXTERIOR OF A NETWORK NODE MODULE

(75) Inventor: Dan Lindqvist, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 273 days.

(21) Appl. No.: 14/003,358

(22) PCT Filed: Mar. 18, 2011

(86) PCT No.: PCT/SE2011/050300
§ 371 (c)(1),
(2), (4) Date: Sep. 5, 2013

(87) PCT Pub. No.: WO2012/128675
PCT Pub. Date: Sep. 27, 2012

(65) Prior Publication Data
US 2014/0006613 A1      Jan. 2, 2014

(51) Int. Cl.
*H04W 8/00*          (2009.01)
*H04W 24/02*         (2009.01)
*H04W 64/00*         (2009.01)
*H04W 88/08*         (2009.01)

(52) U.S. Cl.
CPC .............. *H04W 8/00* (2013.01); *H04W 24/02* (2013.01); *H04W 64/003* (2013.01); *H04W 88/08* (2013.01)

(58) Field of Classification Search
None
See application file for complete search history.

(56) References Cited

U.S. PATENT DOCUMENTS

| 2003/0153359 | A1* | 8/2003  | Kling ......................... 455/561 |
| 2006/0277312 | A1* | 12/2006 | Hirsch ................ H04L 63/0492 709/229 |
| 2009/0156131 | A1* | 6/2009  | Takasu .................. H04W 72/02 455/68 |
| 2010/0285883 | A1* | 11/2010 | Zalewski ....................... 463/39 |
| 2011/0002239 | A1* | 1/2011  | Venkatachalam ............ 370/254 |
| 2011/0057836 | A1* | 3/2011  | Ische et al. ............... 342/357.43 |
| 2011/0178979 | A1* | 7/2011  | Nakagawa ............ G01S 5/0294 706/54 |

FOREIGN PATENT DOCUMENTS

| EP | 2071888 A2    | 6/2009  |
| RU | 2408933 C2    | 1/2011  |
| WO | 0025542 A1    | 5/2000  |
| WO | 2009149104 A2 | 12/2009 |
| WO | 2011008613 A1 | 1/2011  |

* cited by examiner

*Primary Examiner* — Thomas Dailey
(74) *Attorney, Agent, or Firm* — Patent Portfolio Builders, PLLC

(57) ABSTRACT

The invention relates to a method for indicating a physical change in relation to an exterior of a network node module included in a network node in a wireless communication network, such a network node module and such a network node. According to the invention the network node module (19) comprises a movement detector (20) configured to detect movement between a male element and a corresponding female element, where the network node module comprises one of the elements and both elements are required for obtaining an operative network node, and a control unit (24) configured to generate an indication of a physical change of the network node module based on the detected movement.

20 Claims, 6 Drawing Sheets

INDICATING PHYSICAL CHANGE IN RELATION TO AN EXTERIOR OF A NETWORK NODE MODULE

TECHNICAL FIELD

The invention relates generally to wireless communication networks. More particularly, the invention relates to a method for indicating a physical change in relation to an exterior of a network node module included in a network node in a wireless communication network, such a network node module and such a network node.

BACKGROUND

The size of communication networks in terms of the number of nodes they include have increased rapidly in recent years. One type of communication network where this trend is especially strong is the cellular network.

One reason for this growth is the reduction in size of some network nodes, such as base stations. Base stations can nowadays be fairly small and cover a small area. This allows great flexibility in the networks but also puts high demands on them.

When the number of nodes is increasing it is difficult to track that a change has been made to a specific node.

One area where the change to a node may be a problem is the area of identifying the node.

In a communication network there is a need to give each node a unique identification/address to enable individual communication with each unit. Several methods exist to achieve this automatically.

In some systems there is also a need to identify exactly where a module that forms this node is located, or in other words the unit identity must contain location information and not only a unique node-address. One example of such a system is a radio access system consisting of a number of Radio Base Stations (RBS), where the RBS locations must be known for radio frequency (RF) network planning.

A radio access network can be built with many different RBS types, from Macro to Pico/Femto types. Significant for the Macro types are that they are few in numbers and located at large distances from each other. Another significant aspect of a Macro RBS is that it comprises a number of replaceable modules, and that it is connected to an external antenna. These types of RBS often require skilled field operators for installation and commissioning.

Significant for the Pico/Femto RBS networks is that they can consist of a large number of nodes placed close to each other and each RBS can comprise a single replaceable module including the antenna.

In the Macro network the "skilled field operators" can configure the RBS with necessary placement information needed for identification.

In a Pico/Femto access network, the number of field operators is limited in relation to the number of nodes. Network operators may furthermore not be allowed to service some nodes, especially femto nodes, since they may be the private property of a customer. This means that the location identity handling process must be simplified and robust. Furthermore, the entire RBS can for instance be removed, so when removed nothing is left on the site that can carry the location identity. This means that the location identity may be lost. Because of the limited number of field operators, service personnel and the access problem the location identity may be hard to provide to a new or changed node.

There are also other instances where changes of nodes may need to be registered, for instance if a node is tampered with.

There may thus be several changes to a node and these changes need to taken care of in an orderly fashion. There is thus a need for registering the changes being made in relation to network nodes.

SUMMARY

The invention is therefore directed towards registering the physical changes made in a network node.

One object of the invention is thus to detect physical changes made in relation to the exterior of a network node module.

This object is according to a first aspect of the invention achieved through a network node module included in a network node of wireless communication network, where the network node module comprises:
a movement detector that detects movement between a first and a second mating element and the network node module comprises the first mating element and both mating elements are required for obtaining an operative network node, and
a control unit that generates an indication of a physical change of the network node module based on the detected movement.

The object is according to a second aspect of the invention achieved through a network node in a wireless communication network, where the network node comprises at least one network node module. Here the network node module in turn comprises:
a movement detector that detects movement between a first and a second mating element, where the network node module comprises the first mating element and both elements are required for obtaining an operative network node, and
a control unit that generates an indication of a physical change of the network node module based on the detected movement.

The above-mentioned object is according to a third aspect of the invention achieved through a method for indicating a physical change in relation to an exterior of a network node module included in a network node in a wireless communication network. Here the method comprises:
detecting movement between a first and a second mating element, where the network node module comprises the first mating element and both mating elements are required for obtaining an operative network node, and generating an indication of a physical change in relation to the exterior of the network node module, based on the detected movement.

The invention has many advantages. It simplifies the detection of if there has been a change to the physical exterior of a module in a node or not. This simplifies the handling of the situation and can as an example prevent that a module is improperly identified as being unchanged, like being moved to another location.

The network node module may comprise a module memory that is reset based on the detected movement.

The method may likewise comprise resetting a configuration of the network node module based on the detecting of movement. This resetting may be the resetting of the module memory based on the detection of movement.

The control unit of the network node module may furthermore initiate an indication handling procedure based on the generated indication. This may involve sending the indication of the physical change to an indication handling device via the communication unit.

The method may consequently also comprise initiating an indication handling procedure based on the generated indication, where the indication handling procedure may comprise sending the indication of the physical change to an indication handling device.

The indication handling device may be a position generating device and the control unit may, in the indication handling procedure, receive new location data from the position generating device. The indication handling device may furthermore be another network node in the wireless communication network and the control unit may then, in the indication handling procedure, obtain a new configuration from this other network node via the communication unit. The new configuration may comprise new location data.

The control unit may furthermore receive a network identifier from the other network node in indication handling procedure.

The control unit may also carry out at least one security measure based on the generated indication. The indication handling procedure may also comprise a software license handling procedure.

The control unit may furthermore send a fault indication signal based on the detected movement. The network node module may in this case also comprise a counter, which may change value based on the detected movement. A fault indication signal may then only be sent if the counter has a value crossing a fault threshold.

The network node module may furthermore be a first network node module in a set of network node modules comprised in the network node. In this case the movement detector may detect the connection or disconnection of the first network node module to or from a backplane to which at least some of the other network node modules in the set are already connected. In this case the other network node modules each would comprise identical location data, and the control unit would then receive location data from at least one of said other connected modules.

The movement detector may also be mechanical and comprise a shaft, a gear having a number of gear positions each provided with a corresponding readable pattern and a pattern reader. The shaft may then engage with the gear and actuated by a movement between the first mating element and the second mating element. This would in turn cause the gear to move into a new gear position. The pattern reader here reads the pattern and supplies it to the control unit. In this situation the control unit investigates a current and a previous pattern and generates the indication based on a difference.

The first and second mating elements may furthermore be power connector elements and the movement detector be electrical. In this case the movement detector may comprise a switch that changes switch position and thereby causes the generating of the indication when there is movement between the first mating element and the second mating element. The movement detector may then also comprise a voltage dividing arrangement that separates between power on by movement between the first and the second mating elements and other power-on situations.

The first mating element may be a male element, while the second mating element may be a corresponding female element. It is also possible that the first mating element is a female element and the second mating element a corresponding male element.

The network node module may also comprise a positioning unit that obtains the position of the network node triggered by the generated indication.

Finally, the network node module may be a base station module and the network node may be a base station in a wireless communication network.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The present invention concerns a network node in a wireless communication network.

Figure 1:
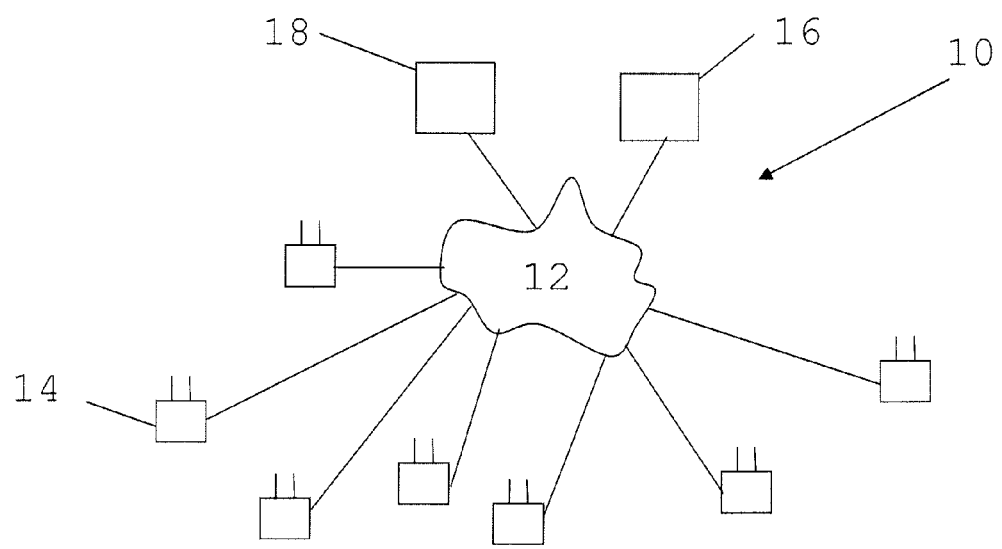
FIG. 1 schematically shows a communication network comprising a number of base stations communicating with further network nodes via a transport network.

The wireless communication network may here be a communication network such as Long-Term Evolution (LTE), Universal Mobile Telecommunications System (UMTS) or Global System for Mobile Communications (GSM). These are just a few examples of networks where the invention can be implemented and it should be realized that the invention can just as well be implemented in other types of networks such as Wireless Local Area Networks (WLANs). The communication network may thus be a cellular communication network and the network node may be a base station. One example of one such communication network is schematically shown in FIG. 1.

The exemplifying communication network 10 comprises a number of base stations, where a first base station 14 is a base station forming a network node 19 employing indications of physical changes according to the principles of the invention. The base stations are furthermore connected to s transport network 12, via which they may communicate with each other as well as with other network nodes. These other network nodes here include a first and a indication handling device 16 and 18. An indication handling device may as an example be a network node such as an Operations and Maintenance (O&M) node. For simplicity only two such nodes are shown here.

Figure 2:
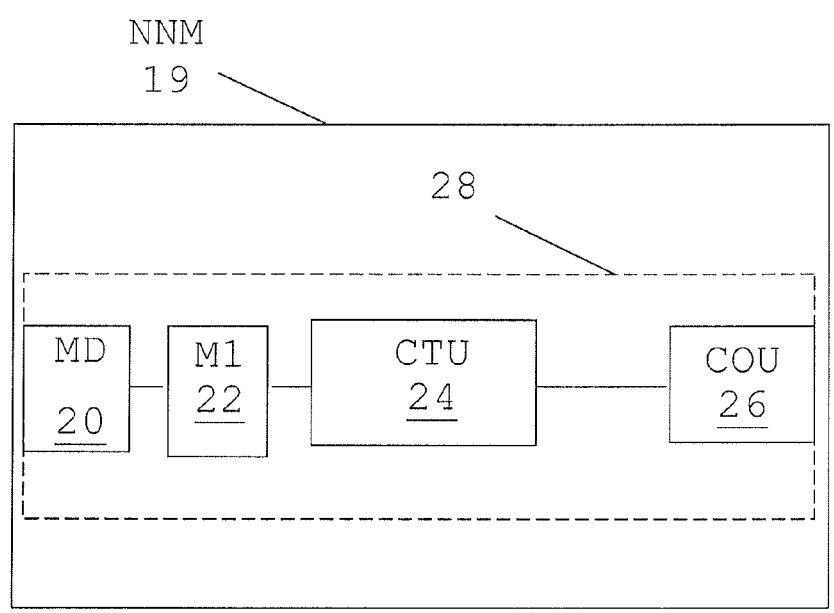
FIG. 2 shows a block schematic of a first variation of a network node module, which forms a complete first network node, FIG. 3 schematically shows a male and female connector element used when detecting physical changes in relation to a network node module.

FIG. 2 shows a block schematic of a first variation of a base station module 19. The module is included in the network node formed by the base station. In this example the module 19 also forms the whole base station 14 in the communication network. The base station module 19 is here shown as comprising a physical change detecting entity 28. This physical change detection entity 28 comprises a movement detector 20, a first memory M1 22, a control unit CTU 24 and a communication unit COU 26. Here the movement detector 20 is connected to the first memory 22, which in turn is connected to the control unit 24. The first memory 22 is here a module memory. Finally the control unit 24 is connected to the communication unit 26.

It should here be realized that the network node module 19 may include many other types of units and functions, such as a radio circuit, modulator, demodulator, amplifier, antenna etc. However, they have here been omitted in order to provide a clearer description of the invention. They furthermore form no essential part of the invention These additional units are furthermore associated with the normal activities of a node, something which this invention does not really address.

The first memory 22 is here with a advantage a non-volatile memory that is able to retain data also when there is no power. The communication unit 26 is in this first variation an interface for communicating with other nodes in the communication network and may for this reason be an interface such as an S2 interface of LTE.

Figure 3:
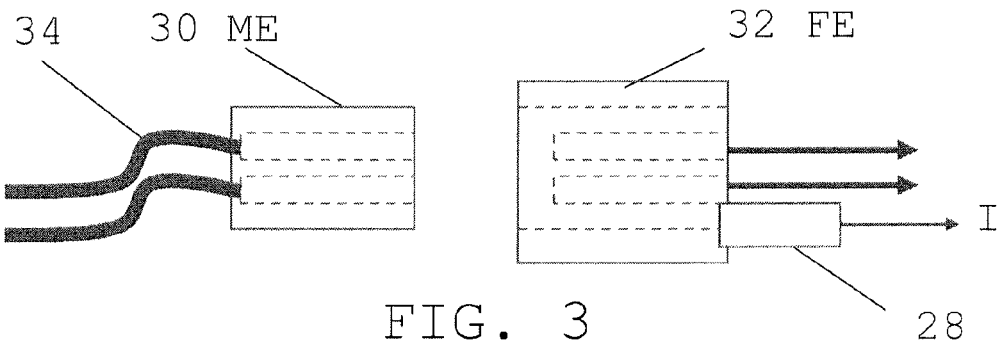
Figure 4:
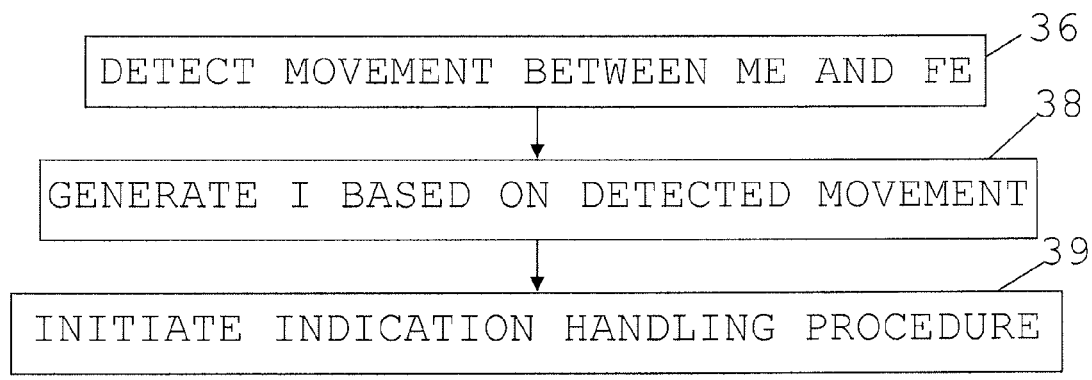
FIG. 4 shows a flow chart of a general method for indicating a physical change in relation to the exterior a first network node module.

FIG. 3 schematically shows a male and a female element, here a male ME 30 and female FE 32 connector element. One of the elements is a part of the module and both elements are required for obtaining an operative network node. The element being a part of the module is here a first mating element, while the element with which this first mating element is to mate is a second mating element. In the example given here the elements are provided for supplying electrical power to the node. According to this first variation of the invention they are also used for detecting a physical change of the above-mentioned module. The male element 30 here includes two pins arranged to be received in corresponding recesses or sockets of the female element 32. The female element 32 is here provided with the physical change detection entity 28. This entity 28 is provided in a cavity including the recesses, which cavity is provided for receiving the male element 30. From this it can be understood that in this variation of the invention the female element is a part of the module. It can thus be seen that in this example the first mating element is a female element and the second mating element a male element. The entity 28 is further separated from the recesses or sockets with which the male pins are to mate. The physical change detection entity 28 is furthermore placed so that initial contact between pin and recess is made before connection is detected. Here the connectors are electrical power connectors, where the male connector therefor is provided with a pair of conductors 34 which provide electrical supply power for the node. The male element 30 may here be a part of a plug for connection to a power distribution network. The female element 32 may on the other hand be a part of an adapter or a converter for converting the supplied power to a form required for operating the module. This thus means that the male and female elements may be elements that are required for the operation of the node. Here they are required because they provide the power required for the operation of the node.

In this example of the invention, the male element 30 is thus to be engaged or inserted into the female element 32 in order to provide power to a base station and to be disengaged or disconnected in order to stop supplying power to a base station. However the engaging or disengaging of the male element with the female element is in this variation of the invention detected by the physical change detection entity 28, which generates a signal I indicative of this physical change.

A first general functioning of the invention will now be described with reference being made to FIGS. 1-4, where the latter shows a flow chart of a general method for indicating a physical change in relation to the exterior of the first network node As mentioned earlier the communication network 10 may include a great number of nodes and they may at various points in time be changed, replaced or updated. Updating may here involve replacing some of or a whole node. A node may also be changed because of other reasons such as because someone is tampering with the node.

These changes are all physical and there is therefore a need to detect such physical changes of the nodes, which are changes of the physical exterior of the node or of a part of the node, like of a network node module making up the whole or parts of the node. After a change has been detected it may then be necessary to perform one of a number of suitable activities. One activity can be to ensure that a replaced node receives correct location data. Another can be that it receives network communication identifier data, such as a network identifier, for instance transport communication identifier data, perhaps in the form of an IP address. This data could for instance be provided by the second indication handling device. A further can be that the module has the correct software installed and the appropriate licenses of that software. It can also be a security activity ensuring the node has not been illegally tampered with.

Thus in order to trigger such an activity there has to be a detection of the change of the exterior. This change of the exterior is according to the invention detected through the connection or disconnection of the male element 30 to or from the female element 32. Therefore as the male element 30 is inserted in or removed from the female element 32, this movement between the male element ME 30 and the female element FE 32 is detected by the movement detector 20 of the physical change detecting entity 28, step 36, which in turn signals this detection to the control unit 24. The movement detector 20 is thus configured to detect movement between the male element 30 and the corresponding female element 32. The control unit 24 then generates an indication I of the movement or change in exterior of the node, step 38. The control unit 24 is thereby configured to generate an indication of a physical change of the network node module based on the detected movement. The control unit 24 furthermore initiates an indication handling procedure, step 39. This procedure is thus initiated based on the generated indication. The procedure may be performed through sending the indication I to one of the indication handling devices via the communication unit 26, for instance to the first indication handling device 16. In this indication handling procedure the control unit 24 may be further configured to obtain a new configuration from this other network node forming the indication handling device. This can include the receiving of location data. The indication handling procedure may additionally or instead be performed through the control unit 24 initiating a procedure internally through providing a number of measures, which measures have to be performed before normal operation can be provided or resumed. These measures may require a field operator to perform activities or enter of required data, such as entry of location data, passwords, code words etc. The control unit may thus also be configured to carry out at least one security measure based on the generated indication.

In this way it is possible to indicate that a physical change has been made to the network node.

Through using the power connector a further advantage is obtained. A notification of a physical change can be sent using the power from the connector. This means that the notification may be obtained without requiring additional power sources.

There are several ways in which the movement detector may be realized, of which three variations, two using electrical components, and one based on mechanical components are described here.

Figure 5:
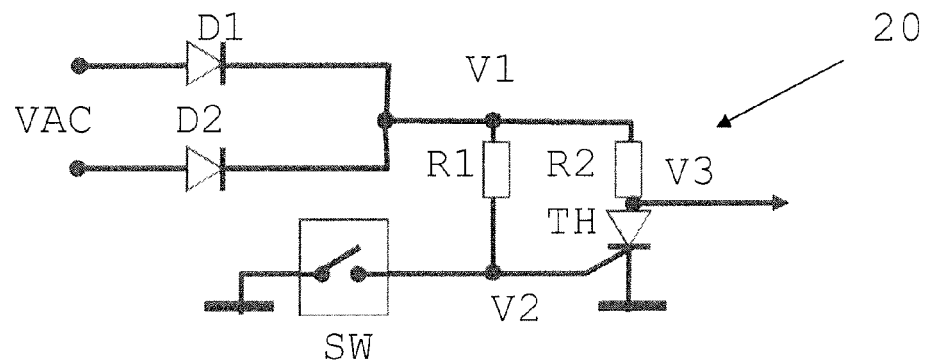
FIG. 5 shows an electric diagram of a first variation of a movement detector used in a network node module.

A first variation of a movement detector, which is an electrical variation based on the power being AC power, is schematically shown in FIG. 5.

An AC supply voltage VAC is here applied between two input terminals, where a first input terminal leads to a first end of a first resistor R1 via a first diode D1, while a second input terminal also leads to the first end of the first resistor R1, however via a second diode D2. A first end of a second resistor R2 is connected to the first end of the first resistor and a second end of the second resistor R2 is connected to the anode of a thyristor TH. The cathode of the thyristor TH is connected to ground and the gate is connected to a second end of the first resistor R1. The second end of the first resistor R1 is furthermore also connected to ground via a switch SW, which may be a mechanically actuated switch.

In FIG. 5 there is shown a first voltage V1 at the first end of the first resistor R1, a second voltage V2 at the second end of the first resistor R1 and a third voltage V3 at the junction between the second resistor R2 and the thyristor TH. The second voltage V2 is here also provided at the gate of the thyristor TH.

Figure 6:
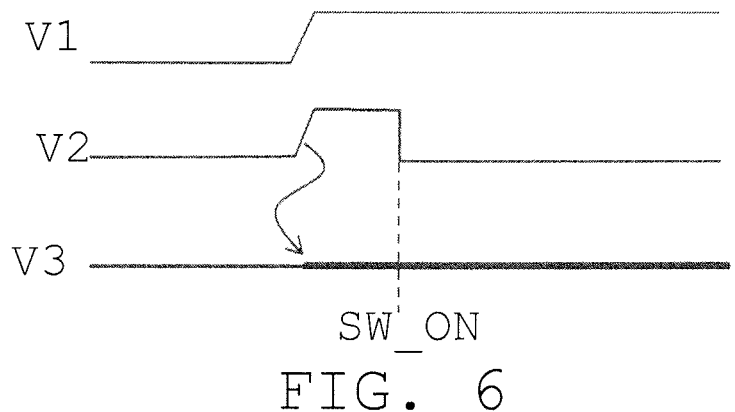
FIG. 6 shows voltages associated with the operation of the first variation of the movement detector in a first use case.

The operation of the movement detector will now be described in relation to FIG. 6, which shows the voltages V1, V2 and V3 and also an indication of when the switch SW is closed.

What happens is that as a male element is inserted into a female element, the supply voltage VAC is received at the terminals, which voltage VAC is rectified by the diodes and provided to the first end of the first resistor R1. This means that the first voltage V1 will act as a DC voltage that goes from a low to a high level as the male and female elements start to engage. As the switch SW is not yet closed, i.e. it is open, the second voltage V2 will be pulled high by the first resistor R1 and follow the first voltage V1. This does in turn lead to the thyristor TH being turned on. Thereby the thyristor TH starts to conduct. The thyristor TH may here be set to be turned on if there is a voltage above zero at the gate. That the thyristor TH is conducting is indicated through the voltage level of the third voltage V3, when the first voltage V1 starts to rise, being shown with a thicker line than the other voltages. Since the thyristor TH is conducting the third voltage V3 is furthermore kept low. Thereafter the switch SW gets actuated through the male connector element being inserted further into the female element. The switch is therefore closed or turned on SW_ON. As this happens the second voltage V2 will become low. However the thyristor TH will keep on conducting and therefore the third voltage V3 will remain low. It can thus be seen that there is created a pulse at the second end of the first resistor R1, which may be used for indicating that a physical change has been made.

Figure 7:
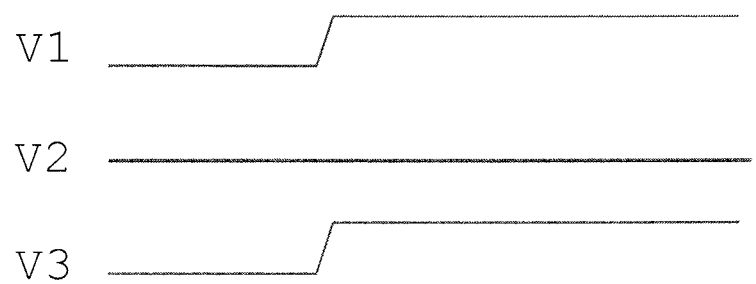
FIG. 7 shows the voltages associated with the operation of the first variation of the movement detector in a second use case.

FIG. 7 shows the same voltage V1, V2 and V3 in case the movement detector receives power when the male element is already inserted in the female element. This means that in this case the switch SW is already closed. Here it can be seen that as power is received, the first voltage V1 will rise from a low to a high level. It will also be seen that since the switch SW is already closed or on, the second voltage V2 will remain at the low level. Since the second voltage V2 is low, this also means that the thyristor TH is turned off, which in turn leads to the third voltage V3 rising together with the first voltage V1. It thus follows the first voltage V1.

The combinations of these three voltages can then be used for indicating that there is a power on. However they can also differentiate between the case that the power is provided through the inserting of the male connector element into the female connector element and some other case such as after a previous power outage. This was thus how the movement detector of FIG. 5 could be used.

It can thus be seen that the power connector is designed such that a switch is added in the bottom of the cavity of the female element. During male element insertion this switch is activated after the power pins make contact. The time difference between power-on and switch activation is used to create a pulse which can be latched and used as an indication of a physical change. Thereby, the physical change detecting entity can take actions when the network node module is properly started. This thus means that when the male element is partly inserted in the female element power is applied. Thereafter when the cable connector is fully inserted in the female element the switch is activated. Furthermore the above described power-up procedure can easily be separated from a power-up procedure when the power connector is already inserted.

It is thus possible to distinguish between various power-on scenarios like, power-on based on power return after an outage, power-on based on external switch closing, power on based on internal switch closing and power-on based on power connection insertion.

As can thus be seen, the male and female elements are power connector elements and the movement detector is electrical and comprises a switch configured to change switch position. This change of switch position causes the generating of the indication when there is movement between the male element and the female element. It can also be seen that the thyristor TH and first and second resistors R1 and R2 together form a voltage dividing arrangement configured to separate between power on by movement between the male and female elements and other power-on situations.

Figure 8:
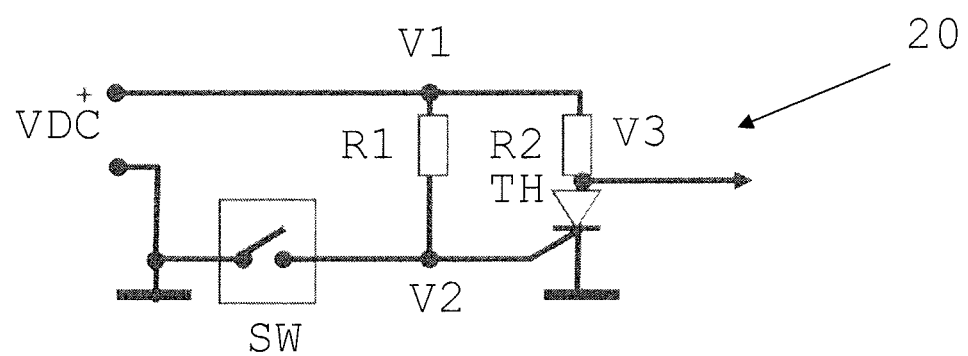
FIG. 8 shows an electric diagram of a second variation of the movement detector.

FIG. 8 shows another electric variation when the supply voltage is a DC voltage. The difference from the variation in FIG. 5 is here that the first connection terminal leads directly to the first end of the first resistor R1, while the second connection terminal leads directly to ground. The two diodes are thus removed. When a DC voltage VDC is applied between the two connection terminals, the same type of operation is achieved as was described in relation to the first variation.

Figure 9:
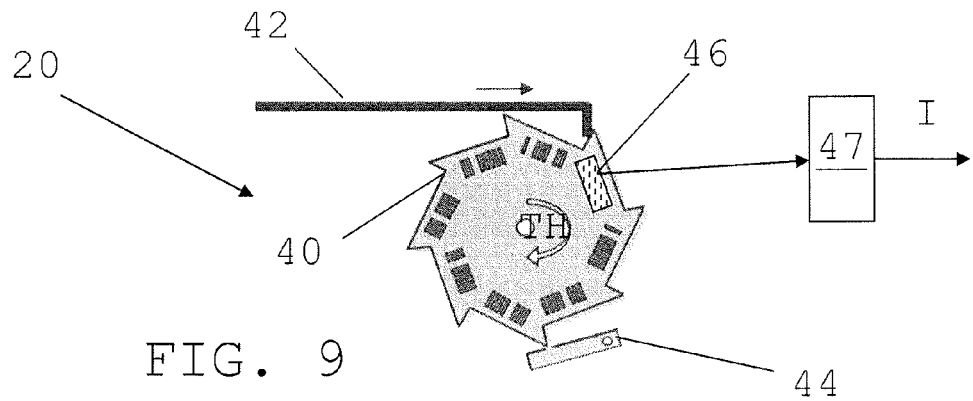
FIG. 9 shows a schematic drawing of a third variation of a movement detector used in the network node module.

Another possible variation is a mechanical variation of the movement detector. Such a realization is schematically shown in FIG. 9. There is here a shaft 42 being actuated by the movement of the male element in relation to the female element. This shaft 42 engages with the teeth of a gear 40. There is a also a spring loaded holding element 44 abutting the gear 40 and more particularly for holding a tooth of the gear. With each tooth there is associated a readable pattern 46, for instance in the form of a bar code, There is finally a pattern reader 47 placed in relation to the gear 40 aligned with the pattern 46 of a tooth to read the readable pattern of this tooth when the gear has a certain position.

The insertion of a male element into the female element will according to this variation cause the shaft 42 to engage with one tooth and thereby move the gear 40 and here turn the gear 40 one gear position so that a new gear position with a new pattern faces the reader 47. The force of the shaft 42 will in turn force the holding member 44 away from a current position and instead hold the next. The shaft thus forces the gear 40 to turn in one direction and the holding element 44 stops the gear 40 from turning in the opposite direction in order to ensure that the gear does not turn backwards.

The gear positions may here all have different codes. As an alternative it is sufficient that adjacent gear positions have different codes or that three consecutive gear positions have three different codes. In this way the movement of the male and female elements in relation to each other will cause a different pattern to be read by the reader 47. This difference can then be used for indicating that there has been a change in the exterior of the node.

It can thus be seen that the movement detector in this variation is mechanical and comprises a shaft 42, a gear 40 having a number of gear positions each provided with a corresponding readable pattern 46 and a pattern reader 47, where the shaft 42 is configured to engage with the gear 40 and to be actuated by a movement between the male element and the female element. In this way the shaft causes the gear to move into a new gear position which the pattern reader 47 is configured to read and supply to the control unit. The control unit then investigates a current and a previous pattern and generates the indication based on a difference.

Put in another way, it can thus be seen that the position of the shaft 42 is altered, which may be through being pushed into the female element when a male element engages or disengages with this female element. This movement will cause a revolution of a gear to a new position; which position will be kept until a next time when the male and female element again engage or disengage. Each gear position will generate a unique pattern. The pattern will be recognized by the reader 47 when the electronic unit is powered on. At power up of the base station, the pattern read by the pattern recognizing device could be compared with a pattern stored in a non volatile memory the last time the unit was powered up. If the patterns are different, the unit is regarded as replaced or new in the system and actions are taken by the unit software. It can thus be seen that in this way the patterns of the gear provides a mechanical memory of change.

The gear can thereby be seen as a mechanical counter which can be read electronically. This can be useful when other than the power connector is used as indication, which may be needed when it is desirable to indicate that a module has been moved from its original position/location. When the module is powered up next time, it can then detect the event and act on it.

Figure 10:
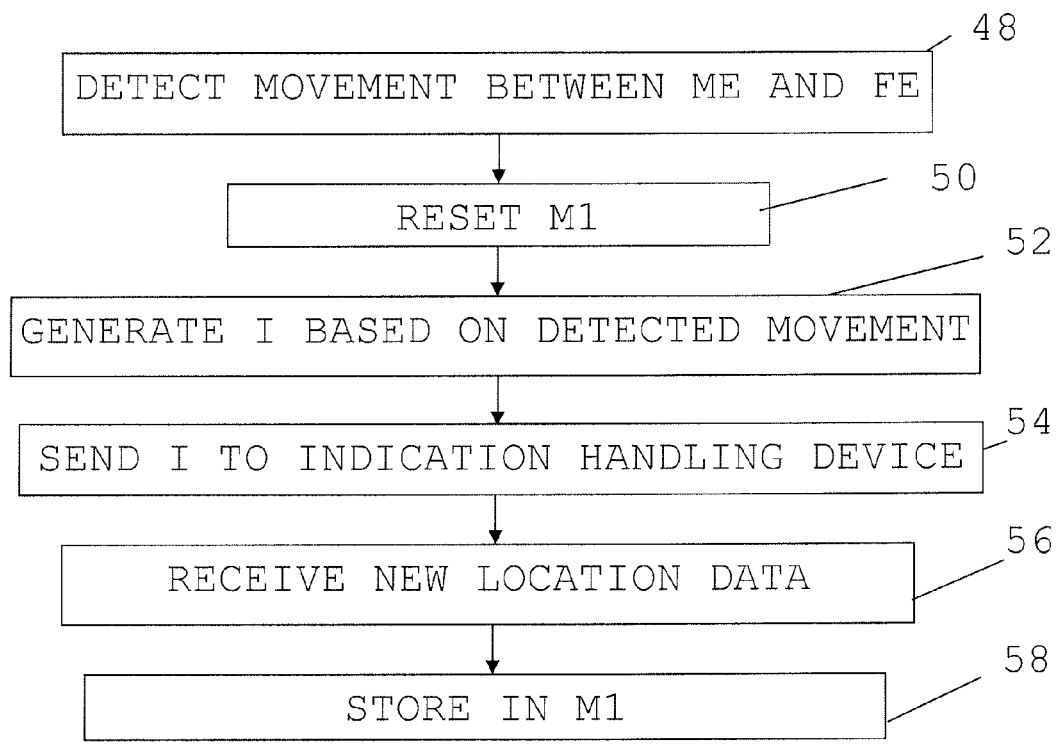
FIG. 10 shows a flow chart of the method according to a preferred embodiment of the invention for indicating a physical change in relation to the exterior of the network node module.

A first preferred way of operating the physical change detecting entity will now be described with reference being made to FIGS. 1, 2 and 10, where the latter shows a flow chart of a method for indicating a physical change in relation to the exterior of a network node module. This variation is concerned with the fact that a node needs to be provided with location data, such as geographical position data. Another type of location data that may be provided to the node is the position in the network topology.

If the network node is a base station, the location data of a base station can not always be based on the physical connection path of the communication network because the network path map may not always be correct, or maybe the network is not even present during the installation of a base station. To have location data stored on another node in the network may therefore not always work.

Getting location data automatically with help of an integrated Global Positioning System (GPS) receiver or using a similar location system is not always possible to use, because the network node may be placed in areas without GPS coverage.

The discussion above shows that in some cases the only option is to place the location data within the network node, and then a new complication arises. The location data may need to be stored in a non-volatile memory to survive a power outage and when a network node module is replaced by another network node module, the location data will follow the replaced network node module. This situation can cause erroneous location data to be present in a node. This invention solves this problem.

The method is here started by the movement detector 20 detecting the movement of the male element 30 in relation to the female element 30, step 48, which may be done through using any of three previously described movement detector variations. This detection in turn causes the resetting of the first memory M1 22, step 50. The first memory 22 is thus reset based on the detected movement. This means that any location data that is present in this memory 22 is reset. Also the control unit 24 is informed of the detection being made. The control unit 24 may then generate an indication I of a physical change of the exterior of the base station based on the detected movement, step 52. The control unit 24 thereafter sends the indication I to the first indication handling device 16 via the communication unit 26, step 54.

The indication handling device 16 may then analyse the indication and provide location data in response. It may for instance analyse the network identifier or transport network address of the device that sent the indication and look up location data associated with that address that it has pre-stored for the network identifier used by the first network node. The location data may here be geographical location or network topology location data. The control unit 24 then receives the new location data as a response to the indication, step 56, and stores this new location data in the first memory 22, step 58. The control unit 24 naturally receives the location data via the communication unit 26. From this it can be seen that in this example the indication handling device is a position generating device and that in the indication handling procedure the control unit is configured to receive new location data from this position generating device.

In this way detection is made of when one network node module is replaced by another, or connected for the first time. The old location data was then cleared and an automatic system function in the first indication handling device triggered that updated the location data. Additionally or as an alternative, if a field operator is at hand, this field operator may be notified that new location data should be provided.

It can thus be seen that according to the invention there is a detection of when an electronic module, here a base station, is mechanically connected to a power supply, this event is memorized/latched so that when the electronic module is started it will detect the situation and may then take an action based on the fact that it is replaced or new in the system.

The detection described above was the detection of a power connector being plugged into a network node module in the form of a base station. It should be realized that another type of detection may be performed. As an alternative it is possible that detection of a physical change is made based on the fact that the module is mechanically attached to a mounting device, e.g. bolted to a surface. A variant of the latter method is when any cable connector is plugged in to the unit.

The embodiment described above was essentially made up of three functions.

A mechanical movable function, affected by the environment around the module, a movement detecting function sensing that a moveable part position, exemplified by the male and female elements, has been changed from its previous position and a memory function that saves the "changed position indication" for later use. This indication can then be read by the control unit when the module is up and running.

The memory was above described as a non-volatile memory. As an alternative, exemplified by the mechanical movement detector variation, the memory can be made as a mechanical entity and work when the unit is un-powered. The memory device can also be made as an electronic part when used indicating a power connector insertion or in situations when the electronic module is already powered e.g. by an internal battery.

In this way it is thus possible that the location data of the base station is updated based on detected changes of the physical exterior, like the connection or the disconnection of a power cord.

A first example on the use of the invention can be that as a new module is installed and power is connected, the new module situation is detected by the indication handling entity. Old location data is then erased from the memory. The installer may then be informed and urged to insert new location data into the module.

After being entered, the new location data is then stored in the memory in the unit.

A second example on the use of the invention in relation to a replacement of a faulty module can be that a new module is installed and power is connected. The new module situation is then detected by the movement detector. The old location data is erased from the non volatile memory in the module. An indication handling device in the communication network is informed and existing location data is downloaded to the node. Thereafter the new location data is stored in the non volatile memory in the module.

A third example on the use of the invention in relation to the combination with a positioning unit like a GPS unit may be that a new module is installed and power is connected. The new module situation is detected. The old Location data is erased from the non volatile memory. The location is fetched from the GPS unit. The new location data is stored in the non volatile memory in the module.

In the given examples a physical change made in relation to the whole network node was detected. It should however be realized that a network node may be made up of several modules. It is thus possible that the same type of detection can be provided in relation to one or more modules of a node.

Figure 11:
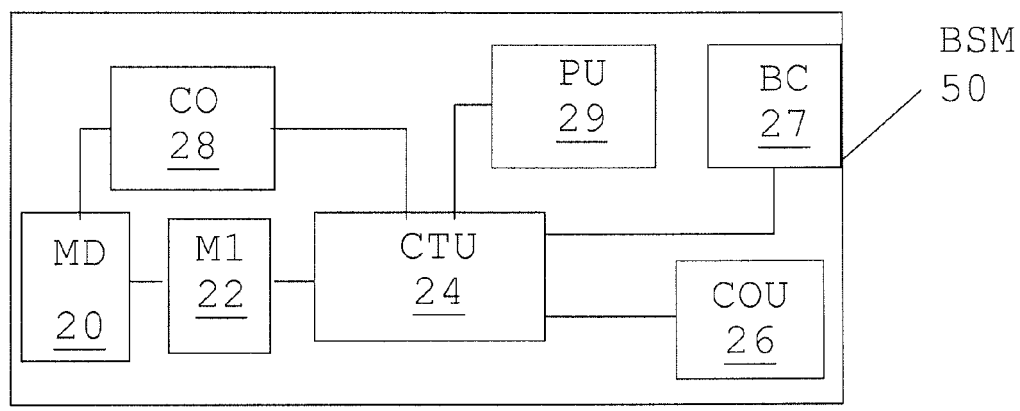
FIG. 11 shows a block schematic of a second variation of a network node module, and FIG. 12 schematically shows a backplane bus for connection to several modules together with the network node module according to the second network node module variation.

FIG. 11 shows a variation of a base station module 50, which may be used as a one of several modules in a base station. The network node module 50 may thus be a first network node module in a set of network node modules comprised in the network node.

This first module 50 includes the same units as the module in FIG. 3. These units furthermore function in the same way. However, in addition it includes a counter 28 being connected to both the movement detector 20 and the control unit 24, a positioning unit 29 connected to the control unit 24 as well as a bus connector 27. The control unit is here a module control unit. Furthermore, the bus connector 27 is an interface to a connector of a backplane bus.

The positioning unit 29 may be a satellite positioning unit that obtains a position from a satellite. It may thus be a Global Positioning System (GPS) unit. In this way it is possible to obtain a position without communication with the communication network.

Figure 12:
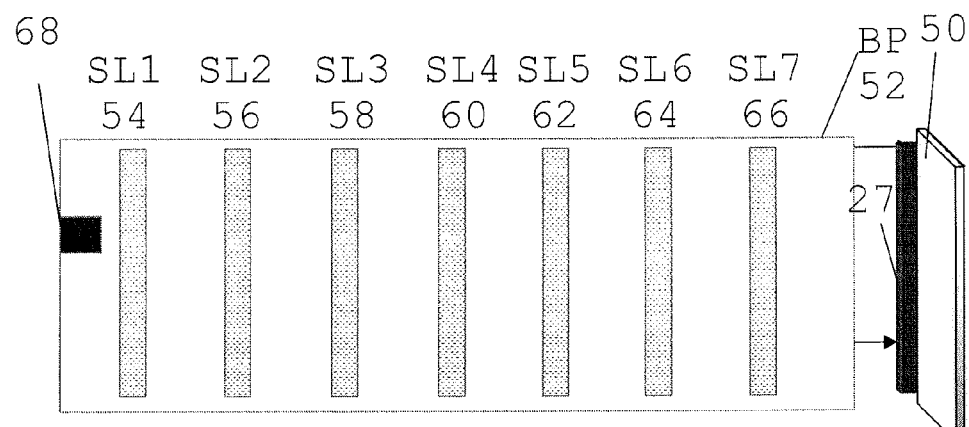

FIG. 12 schematically shows a backplane 52 of a network node with a number of slots where modules in the form of circuit cards may be inserted. There is here a first slot SL1 54, a second slot SL2 56, a third slot SL3 58, a fourth slot SL4 60, a fifth slot SL5 62, a sixth slot SL6 64 and a seventh slot SL7 66. There is also a second memory 68, which second memory is a board memory and also with advantage a non-volatile memory. In the figure the first module 50 with bus connector 27 is also shown.

The male and female elements are here the two connectors, one on the board and the one on the card. Here the first slot 54 may be the female element, while the bus connector 27 on the circuit card 50 may be the male element. From this it can be understood that in this variation of the invention the male element is a part of the first module. In this variation of the invention the first mating element is thus a male element and the second mating element a female element. However, both elements are still required for obtaining an operative network node. Movement may be detected in the same way as described before. However, here it is the connection of a card to the backplane that is detected and not the connection of a power cord. The connection may thus be a data connection but also or additionally a power supply connection.

Figure 13:
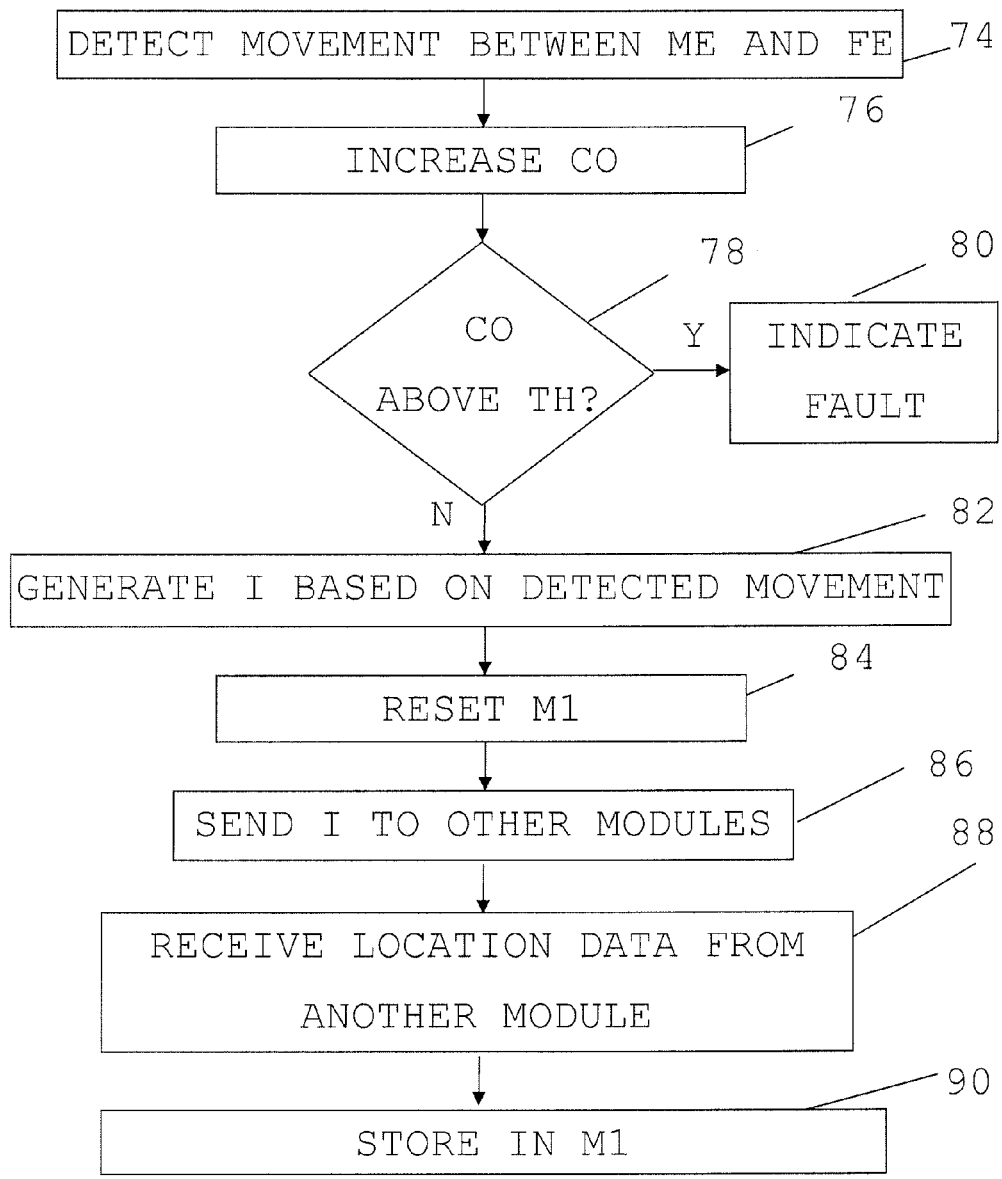
FIG. 13 shows a flow chart of another variation of the method for indicating a physical change in relation to the exterior of a network node module.

The functioning of the invention according to this latest variation will now be described with reference being made to FIGS. 11, 12 and 13, where the latter shows a flow chart of a number of method steps performed in a variation of the method for indicating a physical change in relation to the exterior of the first network node.

As before, the method starts with the movement detector 20 detecting the movement of a male element in relation to a female element, step 74, and here the movement of the bus connector 27 in relation to the first slot 54.

This triggers the counter 28, which increases a counter value CO, step 76. The counter value CO may here be a module or card counter value. The counter 28 is thus configured to change value based on the detected movement. The control unit 24 then obtains this counter value CO and compares it with a counter value threshold, i.e. with a fault threshold. If the counter value is above the threshold, step 78, then the control unit 24 provides a fault indication signal, step 80. A fault indication signal may thus be generated based on the detected movement. The fault indication signal is thus preferably only sent if the counter 28 has a value crossing the fault threshold. The control unit 24 may then send it to another network node, for instance the second indication handling device 18 in the communication network 10. It is also possible that the fault is indicated in some other way, for instance through a visual indication on the card itself. The generated indication may here be an indication that the card or first module is worn out and should be replaced.

If however the threshold is not exceeded, step 78, the control unit 24 generates an indication I of a physical change of the first module based on the detected movement, step 82, and the first memory 22 is then reset, step 84. Thereafter the indication I is sent away from the control unit 24. In this embodiment it is sent to the other modules of the board via the bus connector 27, step 86. If one of these has location data, then this other module will respond with this location data. Therefore the control unit 24 receives location data from another module via the bus connector 27, step 88. This location data is then provided to the first memory 22 and stored in it, step 90. It can thereby be seen that the first network node module is connected to a backplane 52 to which at least some of the other network node modules in the set are already connected and these other network node modules each comprise identical location data. The control unit is then configured to receive location data from at least one of these other connected modules.

Here it is possible that if none of the other modules have such location data, then this data may be obtained via the positioning unit 29. In this case the positioning unit 29 may thus obtain the position of the network node triggered by the generated indication.

Another possible variation is that in the second memory 68 there is stored a corresponding slot counter value and slot counter value threshold assigned to the first slot 54. Both these values may be fetched by the control unit 24 from the second memory 68 via the bus connector 27 as the bus connector 27 of the card 50 is inserted in the slot 54. The control unit 24 then compares the slot counter value with the slot counter value threshold. If the slot counter value crosses the slot counter value threshold, then the control unit may generate a slot fault indication. If the slot counter value does not cross the slot counter value threshold then the control unit 24 increments or decrements the slot counter value and then stores the slot counter value threshold and changed slot counter value in the second memory 68. As an alternative it is possible that instead of the second memory 68 there is a second control unit, i.e. a board control unit on the backplane bus, which second control unit comprises a processor, a counter for each slot and the second memory. In this variation a fault indication concerning the number of card insertions may be sent from the module control unit 24 to the board control unit via the bus connector 27 and first slot 54. The board control unit may then in the same way increase a slot counter each time a card is inserted in a corresponding slot and compare this counter value with a slot counter threshold. Such a board control unit may then indicate a fault if such a threshold has been crossed. As a further alternative it is possible that the module control unit 24 directly reads a slot counter value via the bus connector 27 and directly provides an indication.

In this way it is possible to indicate how many times a specific card has been inserted into slots, which is a degree of the wear of the card. At the same time it is possible to indicate how many times cards have been inserted into a specific slot, which is an indication of the wear of the slot and perhaps also of the board.

The above described counters, which may as an alternative be mechanical using the earlier described shaft principle can thus be used when predicting the lifetime of a module/connector. In many cases there are restrictions on how many times a module can be moved from its position with guaranteed functionality, which is typically the case for connectors. In the exemplifying backplane implementation described above a number of cards are thus inserted in the backplane, which cards may be inserted/removed a number of times. The card connectors and the backplane connectors thus have a guaranteed lifetime that is dependent on how many times they have been inserted/removed. This is detected with a counter functionality of the above described type on each card.

The above described backplane connectors may furthermore each have an identity that is possible to read by the cards. The memory of the backplane control unit may be possible to access from all cards. The non-volatile memories of the modules may in turn be used to store number of insertions in the backplane. Therefore, when a module is powered up or started it may check if it has been inserted in the backplane through reading the counter value of its counter and if so update its non-volatile memory with the new counter value. The module may then checks if a max-insertion limit has been exceeded and if so it may send a notification to the operator. Thereafter the module may update the non-volatile memory on the backplane with the new counter value and the card position. The module may then check if a max-insertion limit has been exceeded for the backplane connector (max-insertion limit, from Backplane non-volatile memory) and if so it sends a notification to the operator.

The invention has a number of advantages. It simplifies the detection of if there has been a change to the physical exterior of a module in a node. This an can prevent that a module is improperly identified in the communication network and by this avoiding a non optimal RF network planning. The invention will also prevent that a field operator will go to the wrong address when replacing a faulty unit. As mentioned earlier there exist countless other types of scenarios where the invention may be employed. As mentioned earlier, this invention can also be used as an indication of tampering. If a module or a cable is removed, an alarm can be raised to the operator.

This invention can also be used as a trigger for;
a new network communication identifier process,
a new license "fingerprint" identifier process,
or a new security initialization process.

The invention was exemplified by being used in a base station. It should however be realized that the invention is not restricted to these, but can be used in any communication network comprising of a number of nodes.

The control unit of the module, and of the board, may with advantage be provided in the form of a processor with associated program memory including computer program code for performing its functionality. It should be realized that this control unit may also be provided in the form of hardware, like for instance in the form of an Application Specific Integrated Circuit (ASIC). The computer program code may also be provided on a computer-readable means, for instance in the form of a data carrier, like a CD ROM disc or a memory stick, which will implement the function of the above-described control unit of the module when being loaded into the above-mentioned program memory and run by the processor.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A network node module configured for inclusion in a network node configured for operation in a wireless communication network, the network node module comprising:
   a movement detector configured to detect movement between a first and a second mating element, where the network node module comprises the first mating element and both mating elements are required for obtaining an operative network node;

a module memory configured to be reset based on the detected movement thereby erasing old location data;

a control unit configured to generate an indication of the detected movement and to initiate an indication handling procedure based on the generated indication, the indication handling procedure comprising receiving new location data; and a counter configured to change value based on the detected movement, wherein, the control unit is configured to only send a fault indication signal, based on the detected movement, if the counter has a value crossing a fault threshold.

2. The network node module according to claim 1, further comprising a communication unit, wherein the control unit is configured to send the indication of the detected movement to an indication handling device via the communication unit.

3. The network node module according to claim 2, wherein the indication handling device is a position generating device and the control unit is configured to receive the new location data from the position generating device in the indication handling procedure.

4. The network node module according to claim 2, wherein the indication handling device is another network node in the wireless communication network and the control unit is configured to obtain a new configuration from this other network node via the communication unit in the indication handling procedure.

5. The network node module according to claim 4, wherein the new configuration comprises the new location data.

6. The network node module according to claim 4, wherein the control unit is configured to receive a network identifier from the other network node in the indication handling procedure.

7. The network node module according to claim 4, wherein the indication handling procedure comprises a software license handling procedure.

8. The network node module according to claim 1, wherein the control unit is further configured to carry out at least one security measure based on the generated indication.

9. The network node module according to claim 1, wherein said network node module is a first network node module in a set of network node modules comprised in the network node, the movement detector is configured to detect the connection or disconnection of said first network node module to or from a backplane to which at least some of the other network node modules in the set are already connected, which other network node modules each comprise identical location data, and the control unit is configured to receive location data from at least one of said other connected modules.

10. The network node module according to claim 1, wherein the movement detector is mechanical and comprises a shaft, a gear having a number of gear positions each provided with a corresponding readable pattern and a pattern reader, said shaft being configured to engage with the gear and to be actuated by a movement between the first mating element and the second mating element thereby causing the gear to move into a new gear position and the pattern reader being configured to read the pattern and supply to the control unit, said control unit being further configured to investigate a current and a previous pattern and generate the indication based on a difference.

11. The network node module according to claim 1, wherein the first and second mating elements are power connector elements and the movement detector is electrical and comprises a switch configured to change switch position and thereby cause the generating of the indication when there is movement between the first mating element and the second mating element as well as a voltage dividing arrangement configured to separate between power on by movement between the first and second mating elements and other power-on situations.

12. The network node module according to claim 1, further comprising a positioning unit configured to obtain the position of the network node triggered by the generated indication.

13. The network node module according to claim 1, wherein the first mating element is a male element and the second mating element is a corresponding female element.

14. The network node module according to claim 1, wherein the first mating element is a female element and the second mating element is a corresponding male element.

15. A network node configured for operation in a wireless communication network, said network node comprising at least one network node module, the network node module comprising:

a movement detector configured to detect movement between a first and a second mating element, where the network node module comprises the first mating element and both mating elements are required for obtaining an operative network node;

a module memory configured to be reset based on the detected movement thereby erasing old location data;

a control unit configured to generate an indication of the detected movement and to initiate an indication handling procedure based on the generated indication, the indication handling procedure comprising receiving new location data; and a counter configured to change value based on the detected movement, wherein, the control unit is configured to only send a fault indication signal, based on the detected movement, if the counter has a value crossing a fault threshold.

16. The network node according to claim 15, wherein the network node module is a base station module and the network node is a base station configured for operation in the wireless communication network.

17. A method for indicating a detected movement of a first network node module in a set of network node modules included in a network node in a wireless communication network, the method comprising:

detecting movement between a first and a second mating element, where the network node module comprises the first mating element and both mating elements are required for obtaining an operative network node;

resetting a module memory based on the detecting of movement thereby erasing old location data;

generating an indication of the detected movement;

initiating an indication handling procedure based on the generated indication, the indication handling procedure comprises receiving new location data;

changing value of a counter on the basis of the detected movement; and sending a fault indication signal, based on the detected movement, only if the counter has a value crossing a fault threshold.

18. The method according to claim 17, wherein the resetting comprises resetting a configuration of the network node module based on the detecting of movement.

19. The method according to claim 18, wherein the module memory comprises location data of the network node module and the resetting of the configuration comprises resetting the module memory based on the detecting of movement.

20. The method according to claim 17, wherein the indication handling procedure comprises sending the indication to an indication handling device.

\* \* \* \* \*